US006901123B2

(12) United States Patent
England

(10) Patent No.: US 6,901,123 B2
(45) Date of Patent: May 31, 2005

(54) MULTI-PANEL PHASED ARRAY ANTENNA, EMPLOYING COMBINED BASEBAND DECISION DRIVEN CARRIER DEMODULATION

(75) Inventor: Jon David England, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 798 days.

(21) Appl. No.: 09/825,132

(22) Filed: Apr. 2, 2001

(65) Prior Publication Data

US 2002/0141513 A1 Oct. 3, 2002

(51) Int. Cl.[7] .............................. H04L 1/00; H04B 1/10
(52) U.S. Cl. .................... 375/347; 375/346; 375/349
(58) Field of Search ................................ 375/316, 326, 375/340, 343, 347, 346, 349; 455/561, 562, 277.2

(56) References Cited

U.S. PATENT DOCUMENTS

| 5,396,256 A | * | 3/1995 | Chiba et al. ................. 342/372 |
| 5,642,358 A | * | 6/1997 | Dent .......................... 370/323 |
| 6,345,188 B1 | * | 2/2002 | Keskitalo et al. ............ 455/561 |
| 6,473,447 B1 | * | 10/2002 | Strich et al. ................. 375/130 |

* cited by examiner

Primary Examiner—Temesghen Ghebretinsae
Assistant Examiner—Sam K. Ahn
(74) Attorney, Agent, or Firm—Allen, Dyer, Doppelt Milbrath & Gilchrist, P.A.

(57) ABSTRACT

A multi-panel phased array antenna architecture and signal processing subsystem combines baseband outputs of multiple carrier demodulators associated with respective phased array panels prior to bit-decision processing at baseband for data and clock recovery. The baseband bit decisions are fed back to control the operation of the carrier recovery loops of the demodulators. This improves the signal-to-noise ratio in the carrier recovery loops and allows near theoretical system operation at lower signal-to-noise ratios than would otherwise be achievable.

19 Claims, 3 Drawing Sheets

MULTI-PANEL PHASED ARRAY ANTENNA, EMPLOYING COMBINED BASEBAND DECISION DRIVEN CARRIER DEMODULATION

FIELD OF THE INVENTION

The present invention relates in general to communication systems, and is particularly directed to a new and improved multi-panel phased array antenna architecture and signal processing subsystem, in which the outputs of multiple carrier demodulators associated with the phased array panels are combined and subjected to bit-decision processing at baseband for data and clock recovery. The combined baseband bit decisions are fed back to control the operation of the carrier demodulators. This improves the signal-to-noise ratio in the carrier recovery loops and allows near theoretical system operation at very low signal-to-noise ratios (such as in systems that employ powerful error correction coder/decoders).

BACKGROUND OF THE INVENTION

Because of the substantial hardware complexity and weight penalties, plus aperture blockage, associated with the use of large sized antenna structures, such as parabolic reflector antennas, communication system users are increasingly turning to reduced mass, phased array antennas for high gain, large aperture applications, such as power-limited, satellite communication terminals. Where the antenna is to be deployed in a what is commonly termed a 'comm on the move' system, such as a land vehicle-mounted or shipboard communication system, there are often practical spatial limitations on the geometric layout of the array and thereby impact the performance of the antenna, especially where hemispherical coverage is required.

For example, as shown in the reduced complexity multi-panel array configuration of FIG. 1, a typical omni-directional coverage architecture places a plurality (three in the illustration) of antenna panel arrays 11, 12 and 13 in mutually orthogonal (X,Y,Z) planes, to allow one or more of the panel arrays to 'see' the signal of interest, irrespective of the orientation of the antenna relative to the direction of incidence of the signal. Each panel array contains a plurality of antenna elements spatially distributed on a planar surface and electronically controlled to form a prescribed beam pattern.

The gain for a signal along the boresight of the beam will depend upon the number of elements that make up the panel array, the gain of an individual element, and the direction of the beam (corresponding to the angle of incidence of the signal on the panel.) Maximum gain for a respective panel array occurs when the incidence angle is perpendicular to the array; the gain goes to zero when the incidence angle is zero or parallel to the surface of the panel array. The shape of the gain pattern is function of the array design. For signals that can be 'seen' by each of the three array panels 11, 12, 13 in the architecture of FIG. 1, the gain that can be obtained by combining each panel's contribution can be made the same as the maximum gain (e.g., raised cosine) for an individual panel array.

As diagrammatically illustrated in FIG. 2, in a conventional communication terminal that employs a gimballed (parabolic) dish 30, the output of the antenna feed, as received by a low noise amplifier (LNA) 31, is downconverted in a downconverter 33 to produce an IF signal, which is then applied to a demodulator 35 to derive the information signal (e.g., respective bits of a digitally encoded signal). These derived bits may then be subjected to intermediate processing (e.g., de-interleaving, decoding, decryption, demultiplexing, and the like) before being forwarded to the user. Where the terminal employs a multi-panel phased array, such as that shown in FIG. 1, described above, each panel array effectively operates as a separate antenna, so that multiple RF signals from the respectively different panel arrays 11, 12 and 13 are processed in combination to derive the information signal. This means that the performance of a multi-panel array is governed by the effectiveness of combined processing of the panel array outputs.

One relatively straightforward approach, diagrammatically shown in FIG. 3, would be to insert a switch 40 between the output of each panel and the downstream signal processing circuitry, and then couple the signal processing circuitry to whatever panel currently has the 'best' view of the signal (i.e., the panel array for which the angle of incidence of the signal is largest (closest to 90°). To compensate for discontinuities associated with switching from panel to panel, it would be necessary to employ some form of 'handover' mechanism for the demodulator/bit synchronizer, which could be relatively complex and thus significantly offset the apparent simplicity of the 'switched' approach.

In addition, as the multi-panel orientation is varied relative to the signal source, the angle of incidence of the signal on the panel array having the 'best' view can go as low as about 35°, before switchover to another panel's view is required. This means that the overall antenna gain can be as much as 5 dB below the maximum gain. For a theoretically optimum scheme, the overall gain would be equal to the maximum panel gain regardless of antenna orientation. The worst-case performance of the approach of the architecture of FIG. 3 is therefore the same as a theoretically optimum case, with one-third as many elements in each panel array. Namely, using this apparently simple 'switchover' concept would triple the antenna cost relative to a theoretically optimum design.

A second approach, shown diagrammatically in FIG. 4, relies upon knowledge of the spatial coordinates of the panel arrays, as well as antenna beam forming information to dynamically control the operation of a coherent combiner 50 coupled between the output of each panel and the downstream signal processing circuitry. Although this design ostensibly provides theoretically optimum performance, combining the RF outputs of multiple panel arrays also severely distorts the composite beam. Since in a practical application the panel arrays can be expected to be spaced apart by a substantial distance, which could be one hundred feet or more in a shipboard installation, the resulting pattern will contain unwanted 'grating' nulls. Even if some form of null compensation could be employed, there also remains the issue of the effect of the actual combiner implementation. For example, if a land vehicle upon which a terminal is mounted is moving across rough terrain, it may be necessary to compensate for the effects of structure flexing (particularly at higher signal frequencies having very short wavelengths).

SUMMARY OF THE INVENTION

In accordance with the present invention, these shortcomings of conventional multiple phased array panel architectures by a 'diversity' type combiner architecture, that is similar to spatial diversity systems used to mitigate against the effects of location dependent signal sources. As noted above, grating nulls that result from using a coherent combiner operating at RF are related to phase differences between very small wavelength RF signals. The present invention eliminates phase as a factor in the combining process by downconverting the output of each panel to a carrier-demodulated baseband signal 'before' combining. Each panel array's associated carrier demodulator regenerates a coherent carrier reference signal that is used to demodulate that panel's signal, and contains a matched filter bit detector that converts the demodulated signal to soft bit decisions. These soft bit decisions are then time aligned, weighted, subjected to an ambiguity resolution process and summed together in a diversity combiner to produce a composite-based bit decision output to a bit synchronizer for clock regeneration and bit decision. The output of the bit synchronizer is then supplied to the user for subsequent processing.

In addition, the bit synchronizer output is fed back to the carrier demodulators for controlling the operations of their carrier recovery loops. This improves the signal-to-noise ratio in the carrier recovery loops and allows near theoretical system operation at very low signal-to-noise ratios (such as in systems that employ powerful error correction coder/decoders). Noise introduced by the fed back bit decisions is based upon the combined signal-to-noise ratio ($E_B/N_0$), then, regardless of the $E_B/N_0$ at a respective carrier demodulator's input, so that the overall noise in each carrier recovery loop is reduced relative to a conventional demodulator. Noise reduction is most pronounced when the carrier demodulator input $E_B/N_0$ is significantly degraded by a low incidence angle of the incoming signal, as the combined $E_B/N_0$ remains comparatively high and is independent of the orientation of the multi-panel arrays.

Pursuant to a non-limiting but preferred embodiment of the 'diversity' combiner architecture of the invention, a respective carrier demodulator has its IF input signal from an upstream downconverter multiplied by a baseband reference frequency signal supplied by a frequency synthesizer within the combiner. The resulting product provides a secondary IF frequency signal, which is filtered to remove unwanted components and coupled to respective in-phase (I) and quadrature (Q) channel associated multipliers of respective I and Q channels. These multipliers receive I and Q reference frequency signals supplied by a variable frequency oscillator operating at the secondary IF frequency, and are driven by a control voltage from a loop filter coupled to the output of a Q channel phase detector. The loop filter removes noise in the control voltage produced by the phase detector and controls the operation of the variable frequency oscillator, such that its I and Q outputs track the phase of the secondary IF signal carrier.

The Q channel phase detector is coupled to the output of a matched filter which receives the output of a multiplier in the quadrature channel. The phase detector receives bit decisions produced by the data recovery circuitry of the bit synchronizer, which operates on the combined I outputs of the carrier demodulators as produced by a combiner circuit. The baseband-sourced bit decisions are used to direct the Q signal path in each demodulator, and produce a noise-corrupted measurement of the phase difference between the secondary IF signal carrier and the output of the variable frequency oscillator.

The I channel component of the quadrature demodulator output is a noise-corrupted baseband representation of the input signal data modulation, and is weighted by an external control signal according to its relative signal-to-noise ratio. The weighting control signal may be derived in accordance with signal incidence angle. The carrier demodulator whose input has the highest signal-to-noise ratio is given the highest weight, while the carrier demodulator whose input has the lowest signal-to-noise ratio is given the lowest weight. If the carrier recovery loop is out of lock, weighting is set to zero. The weighted I channel components of the quadrature demodulators are combined in a manner that resolves data polarity ambiguity at the carrier demodulator, so that all baseband signal samples are set to the same polarity prior to being summed.

The output of the Q channel phase detector is weighted by the external control signal according to its relative signal-to-noise ratio. The weighted phase detector outputs of the quadrature demodulators are combined to provide a composite phase error voltage, which is filtered in an automatic frequency control loop filter and applied to the frequency synthesizer that generates the secondary IF signals to the carrier demodulators. The AFC loop filter tracks out any frequency offsets on the RF samples that may be caused by system reference oscillator errors, or average motion of the signal source and the antenna terminal.

The AFC loop filter also cancels large frequency offsets from the inputs of the individual carrier recovery loops and thereby simplifies the problem of individual carrier recovery loop acquisition at low angles of signal incidence. Because of the AFC loop, the primary function of the individual carrier recovery loops is to maintain phase tracking in the presence of relatively small differential Doppler-related frequency shifts that may result from antennal support platform orientation variations.

DETAILED DESCRIPTION

Figure 1:
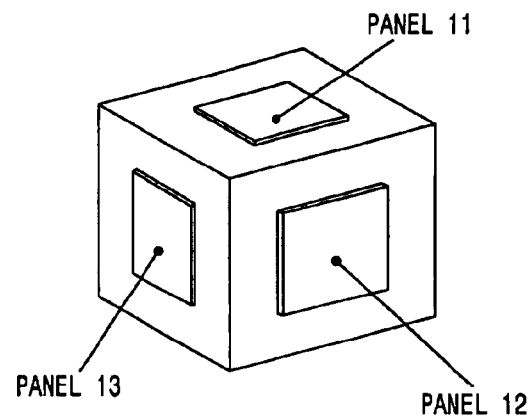
FIG. 1 depicts a reduced complexity multi-panel antenna array configuration employed for omni-directional coverage.
Figure 2:
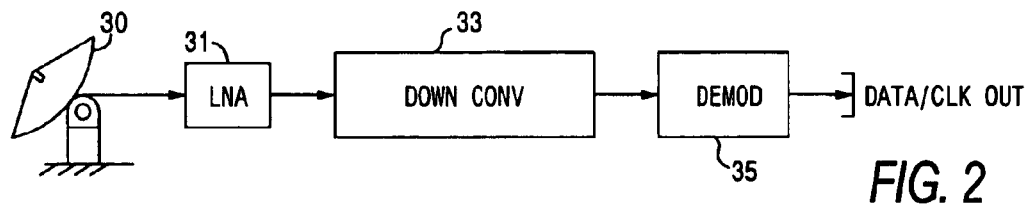
FIG. 2 diagrammatically shows a conventional communication terminal that employs a gimballed (parabolic) dish.
Figure 3:
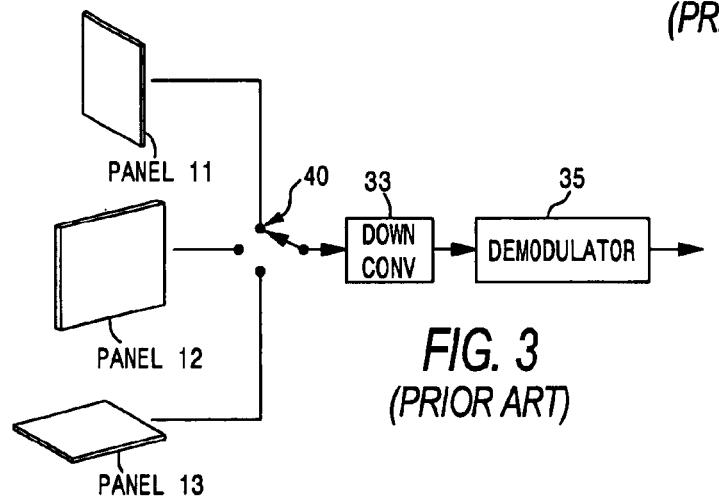
FIG. 3 illustrates a multi-panel antenna array configuration in which downstream signal processing circuitry is controllably switched to a selected panel array.
Figure 4:
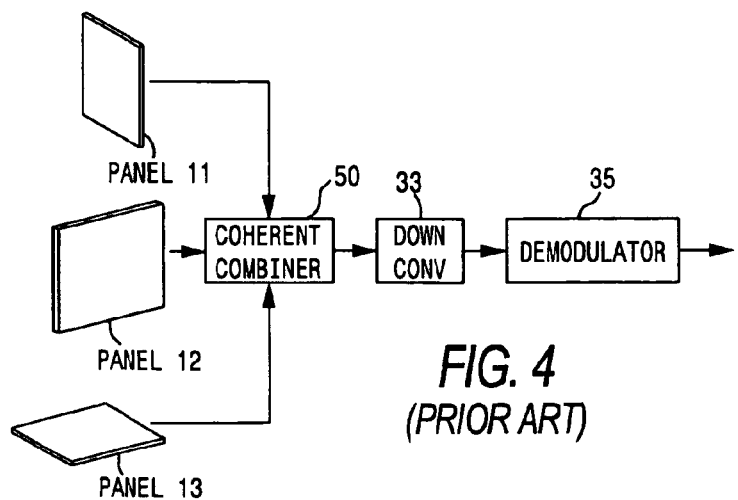
FIG. 4 shows a multi-panel antenna array coupled by way of a coherent RF combiner to downstream signal processing circuitry.

Before describing in detail the new and improved multi-phased array antenna architecture of the present invention, that employs combined baseband decision driven carrier demodulation, it should be observed that the invention resides primarily in prescribed modular arrangements of conventional communication signal processing circuits and components. In a practical implementation that facilitates their incorporation into existing printed circuits of communication equipment, these modular arrangements may be readily implemented in a field programmable gate array (FPGA), or application specific integrated circuit (ASIC) chip.

Consequently, the configuration of such arrangements of circuits and components and the operation thereof have, for the most part, been illustrated in the drawings by readily understandable block diagrams, which show only those specific details that are pertinent to the present invention, so as not to obscure the disclosure with details which will be readily apparent to those skilled in the art having the benefit of the description herein. In this regard, the diagrammatic illustrations have omitted any analog-to-digital components that might be employed to convert input signals are converted to digital format for processing by digitally implemented signal processing circuits.

In addition, various gain control devices and automatic gain control loops that may be employed to ensure that various circuits always operate within their design limits are considered implementation details that do not materially affect the description herein and have therefore been omitted to reduce the complexity of the diagrams. Thus, the diagrammatic illustrations are primarily intended to show the major components of the invention in convenient functional groupings, whereby the present invention may be more readily understood.

Figure 5:
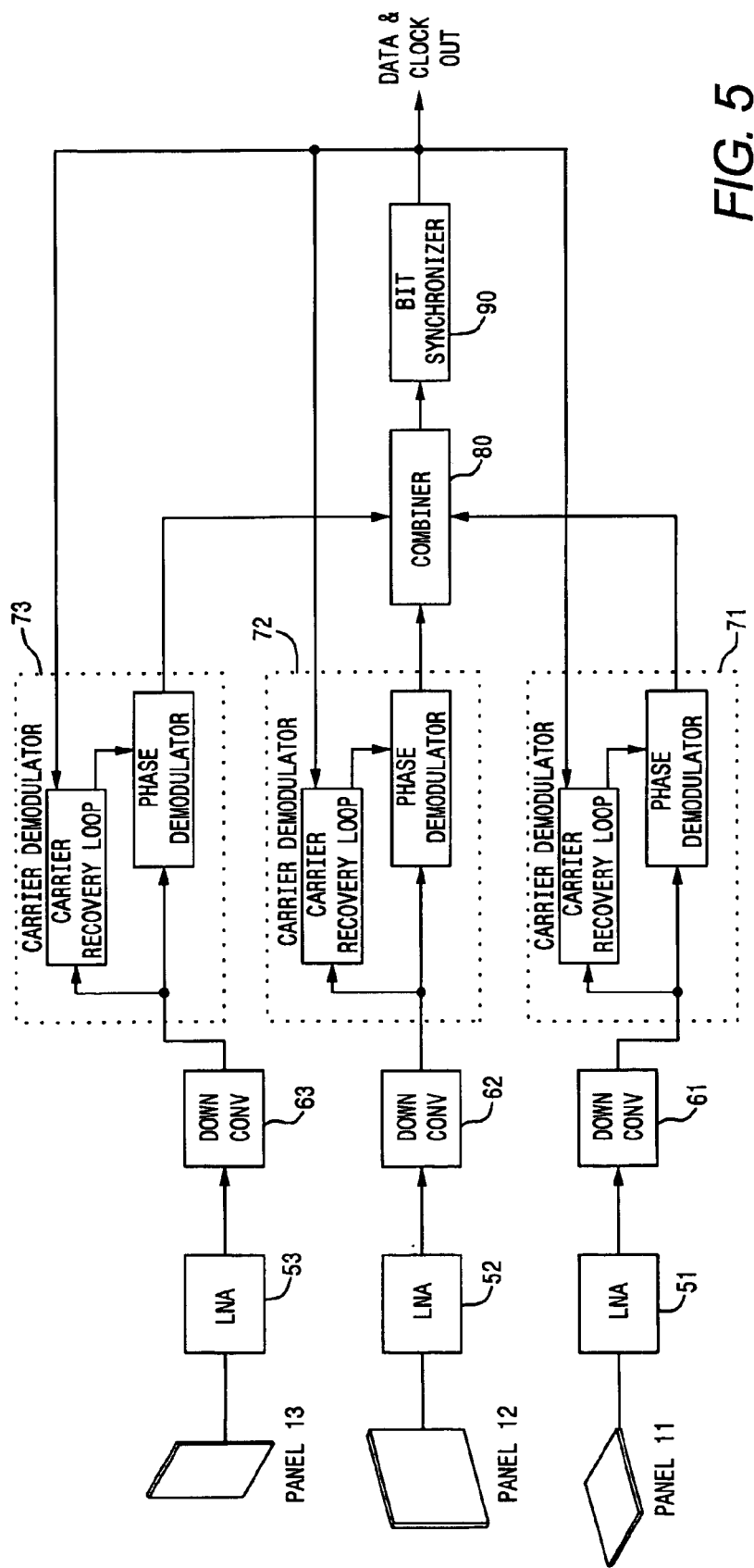
FIG. 5 diagrammatically illustrates the architecture of a multiple phased array antenna architecture which employs a combined baseband decision driven carrier demodulation scheme in accordance with the present invention.

The overall architecture of a multi-phased array antenna architecture which employs a combined baseband decision driven carrier demodulation scheme in accordance with the present invention is diagrammatically illustrated in FIG. 5. The antenna itself may be comprised of a plurality of antenna panel arrays, as shown at 11, 12 and 13 in the antenna configuration of FIG. 1, and mounted in mutually orthogonal (X,Y,Z) generally planar support surfaces. Now although the support surfaces for antenna panel arrays 11, 12 and 13 of the diagrammatic illustration of FIG. 1 are in relatively close proximity (e.g., akin to three mutually adjacent sides of a 'cube', it is to be understood that such surfaces are merely illustrative and not limitative of the invention. As pointed out above, in a practical, real world environment, such as aboard a dynamic platform (e.g., ship), it can be expected that the support surfaces may be spaced apart from one another, typically at whatever locations are available. The number and orientation of panel arrays are such as to provide the intended spatial (e.g., full hemispherical) coverage. Also, as in the architecture of FIG. 1, each panel array contains a plurality of spatially distributed antenna elements that are electronically controlled to form a prescribed beam pattern for that array.

As shown in the signal processing system diagram of FIG. 5, the panel array outputs are coupled to associated LNAs 51, 52, 53, whose outputs are downconverted in respective downconverters 61, 62, 63. The IF signals produced thereby are applied to respective carrier demodulators 71, 72, 73, which are operative to regenerate a coherent carrier reference signal that is used to demodulate each respective panel's output signal. As will be described with reference to the detailed circuit diagram of FIG. 6, each demodulator contains a matched filter bit detector that converts the demodulated signal to soft bit decisions. The soft bit decisions are time aligned, weighted and subjected to an ambiguity resolution process to produce demodulated signals. These demodulated signals are coupled to and summed together in a diversity combiner 80, which outputs a composite-based bit decision to a baseband signal processor in the form of a bit synchronizer 90 for clock regeneration and data recovery. The output of the bit synchronizer 90 is supplied to the user for subsequent processing.

In addition to providing data and clock, the bit synchronizer 90 output is fed back to the carrier demodulators 71, 72, 73 for controlling the operations of their carrier recovery loops. As noted above, this serves to improve the signal-to-noise ratio in the carrier recovery loops and allows near theoretical system operation at very low signal-to-noise ratios (such as in systems that employ powerful error correction coder/decoders).

Moreover, as noise introduced by the fed back bit decisions from the bit synchronizer 90 is based upon the combined signal-to-noise ratio of its input signal, the overall noise in each carrier recovery loop is reduced relative to that of a conventional demodulator. The extent of noise reduction is most noticeable where input signal-to-noise ratio to the carrier demodulator is degraded as a result of a low incidence angle of the incoming signal. In this case, the combined signal-to-noise ratio will remain comparatively high and is independent of the orientation of the multi-panel arrays.

Figure 6:
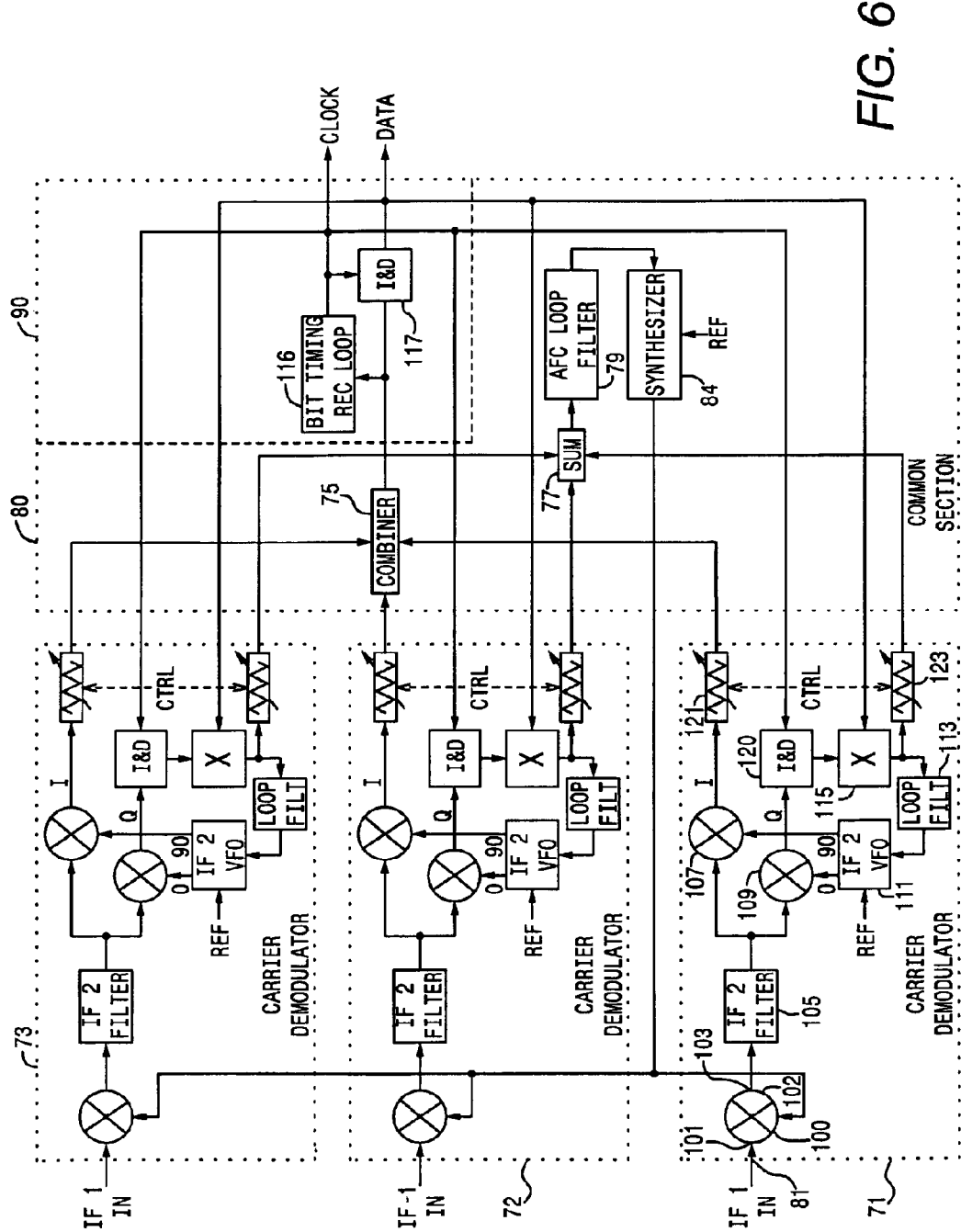
FIG. 6 is a non-limiting but preferred embodiment of a circuit implementation of the baseband decision-driven carrier demodulator and combiner—bit synchronizer architecture of the embodiment of FIG. 5.

A non-limiting but preferred embodiment of a circuit implementation of the baseband decision-driven carrier demodulator and combiner—bit synchronizer architecture of the present invention, for the case of processing outputs from three mutually orthogonal antenna panels, as in the embodiment of FIG. 5, is diagrammatically illustrated in FIG. 6. In order to provide a concise description, only the signal processing path through the demodulator 71—associated with antenna panel array 11—will be described, it being understood that the description of demodulator 71 applies equally to the signal processing paths through demodulators 72 and 73 associated with antenna panel arrays 12 and 13, respectively. Also, for purposes of providing a non-limiting example, the received signals will be considered to be modulated with bi-phase, phase shift keyed (PSK) modulation, at data rates up to about 10 Mbps. The panel separation distance may be on the order of one meter.

Carrier demodulator 71 has a primary IF input port 81 coupled to its associated upstream downconverter 61. IF input port 81 is coupled as first input 101 of a multiplier 100, a second input 102 of which is coupled to receive a baseband reference frequency signal output by a frequency synthesizer 84 within the downstream combiner 80. The output 103 of multiplier 100 provides a secondary IF frequency signal, which is filtered in an IF filter 105 to remove any unwanted components (e.g., spurs). The filtered secondary IF frequency output by filter 105 is coupled to respective in-phase (I) and quadrature (Q) multipliers 107 and 109 installed in the I and Q channels. The I and Q multipliers 107 and 109 also receive I and Q reference frequency signals supplied by a variable frequency oscillator (VFO) 111 operating at the secondary IF frequency.

The VFO 111 is driven by a control voltage from a loop filter 113, which is coupled to the output of a phase detector 115. The loop filter 113 removes most of the noise in the control voltage produced by the phase detector 115 and controls the operation of the VFO 111, such that its I and Q outputs track the phase of the secondary IF signal carrier. The phase detector 115 is coupled to the output of a matched filter 120, shown as being implemented as an integrate and dump (I&D) circuit, which is coupled to the output of multiplier 109 in the quadrature channel. The phase detector 115 also is coupled to receive bit decisions produced by another integrate and dump circuit 117 in the data recovery circuitry of the bit synchronizer 90, which operates on the combined I outputs of the carrier demodulators 71, 72 and 73, as produced by a combiner 75.

As described briefly above, these baseband-sourced bit decisions are used to direct the Q signal path in each demodulator, and produce a noise-corrupted measurement of the phase difference between the secondary IF signal carrier and the output of the VFO 111. The I channel component of the quadrature demodulator output from multiplier 107, which is a noise-corrupted baseband representation of the input signal data modulation, is coupled to a weighting circuit 121, and is weighted by an external control signal from the system microcontroller (not shown) according to its relative signal-to-noise ratio.

As a non-limiting example, the weighting control signal may be derived in accordance with signal incidence angle. That one of the three carrier demodulators 71, 72, 73 whose input has the highest signal-to-noise ratio is given the highest weight, while the three carrier demodulator whose input has the lowest signal-to-noise ratio is given the lowest weight. If the carrier recovery loop is out of lock, weighting is set to zero. The weighted I channel components of the quadrature demodulators as output by the weighting circuits 121 are combined in combiner 75 and supplied to a bit timing and recovery loop 116 and to integrate and dump circuit 117. The combiner 75 also resolves data polarity ambiguity at the carrier demodulator so that all baseband signal samples are set to the same polarity prior to being summed.

The output of the phase detector 115 is coupled to an associated weighting circuit 123, wherein it is weighted in accordance with the external control signal from the system microcontroller (not shown) according to its relative signal-to-noise ratio, as described above. The weighted phase detector outputs of the quadrature demodulators are combined in summing circuit 77 to provide a composite phase error voltage. This composite phase error voltage is filtered in an automatic frequency control (AFC) loop filter 79 and applied to the frequency synthesizer 84 that generates the secondary IF signals to the carrier demodulators, as described above.

The AFC loop filter 79 serves to track out any frequency offsets on the RF samples that may be caused by system reference oscillator errors, or average motion of the signal source and the antenna terminal. The AFC loop filter also cancels large frequency offsets from the inputs of the individual carrier recovery loops 71, 72, 73, and thereby simplifies the problem of carrier recovery loop acquisition at low angles of signal incidence. Because of the AFC loop, the primary function of the individual carrier recovery loops is to maintain phase tracking in the presence of relatively small differential Doppler-related frequency shifts, that may result from antennal support platform orientation variations (roll, pitch, yaw).

In the above example, the signals received by the antenna panel arrays were considered to contain bi-phase PSK modulation. It should be understood, however, that the invention is not limited to use with these or any other parameters. For example, where quadrature (Q)PSK modulation is employed, both the I and Q channels of each quadrature demodulator would include a matched filter. Also, the phase detector would be coupled to receive the matched filter outputs and be controlled by both I channel and Q channel bit decisions from downstream I and Q channel bit synchronizers. In addition, the Q baseband output of the carrier demodulator is weighted the same as the I output and supplied to the combining circuitry. Because of the additional channel, the combining circuitry requires an additional combiner and matched filter operating on the Q channel outputs of the carrier demodulators. The resulting output is fed back to the carrier demodulators, together with the I channel bit decisions for controlling the phase detectors.

The use of a relatively low data rate of up to about 10 Mbps, and a relatively 'close' panel separation on the order of one meter in the above embodiment avoids the need to compensate for timing skews that result from a signal arriving at the different panels 11, 12, 13 at different times due to slight differences in path length. No compensation is necessary if the timing skews are very small relative to one bit period. If the skews are large, however, differential timing compensation is required. For this purpose, dynamically variable delay elements are inserted in series with all of the weighting circuits, and with the inputs to the matched filters in the carrier demodulators. In addition, a differential delay calculation for each panel array, based on panel location and relative panel orientation, must be effectively continuously updated, and used to control the delays. This compensation technique is limited to using delays that are insufficiently large relative to the bit period to affect the stability of the carrier recovery loops.

At some RF carrier frequencies, it may be necessary to compensate the AFC and carrier recovery loops due to Doppler-induced stress that results from antenna panel platform dynamics. For this purpose, a differential Doppler correction term may be imparted to the input of the VFO 111 in each carrier recovery loop. A differential Doppler calculation for each panel derived in accordance with panel location and platform motion may be continuously updated and used to supply correction terms to the VFO inputs.

Compensation for a common frequency shift is also necessary if the platform dynamics include a common acceleration component, resulting in a Doppler effect that is too large for the AFC loop to track. In this case, a common Doppler correction term is added to the input to the synthesizer 84 in the AFC loop. A common Doppler calculation for each panel array based on platform motion must be continuously updated and used to provide the correction term.

As will be appreciated from the foregoing description, shortcomings of conventional multiple phased array panel architectures are effectively circumvented by a 'diversity' type combiner architecture, that effectively eliminates phase as a factor in the combining process, by downconverting the output of each panel array to a carrier-demodulated baseband signal 'before' combining. Each panel array's associated carrier demodulator regenerates a coherent carrier reference signal that is used to demodulate that panel's signal, and contains a matched filter bit detector that converts the demodulated signal to soft bit decisions. These soft bit decisions are then time aligned, weighted, subjected to an ambiguity resolution process and summed together in a diversity combiner to produce a composite-based bit decision output to a bit synchronizer for clock regeneration and bit decision. In addition, the bit synchronizer output is fed back to the carrier demodulators for controlling the operations of their carrier recovery loops. This improves the signal-to-noise ratio in the carrier recovery loops and allows near theoretical system operation at lower signal-to-noise ratios than would otherwise be achievable.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed is:

1. An antenna system comprising:
   a plurality of antennas having a prescribed multidimensional spatial relationship with respect to one another;

a plurality of carrier demodulators respectively coupled to receive downconverted signals representative of outputs of said plurality of antennas, and being operative to output baseband, carrier-demodulated signals;

a signal processor which is operative to process a combination of said baseband, carrier-demodulated signals to derive baseband information signals contained therein; and wherein operation of each of said plurality of carrier demodulators is controlled in accordance with said baseband information signals derived by said signal processor, and wherein each of said carrier demodulators is operative to regenerate a coherent carrier reference signal for demodulating said down converted signal from each of said plurality of antennas, and is operative to convert a carrier-demodulated signal to soft decision information signals, and wherein said signal processor is operative to combine said soft decision information signals to produce a composite baseband signal, and to process said composite baseband signal to derive baseband decision information signals, which are fed back to control the internal operation of each of said plurality of carrier demodulators.

2. An antenna system according to claim 1, wherein said plurality of antennas comprises a plurality of spaced apart, phased array antenna panels.

3. An antenna system according to claim 1, wherein each of said carrier demodulators includes a matched filter detector that converts said carrier-demodulated signal to said soft decision information signals.

4. An antenna system according to claim 3, wherein operation of carrier recovery loops of said plurality of carrier demodulators is controlled in accordance with said baseband decision information signals.

5. An antenna system according to claim 4, wherein the operation of the carrier recovery loops of said plurality of carrier demodulators is weighted in accordance with a weighting control signal representative of prescribed signal-to-noise ratio information associated with a signal incident upon said plurality of antennas.

6. An antenna system according to claim 1, wherein each of said plurality of carrier demodulators is configured to weight baseband, carrier-demodulated signals in accordance with a weighting control signal representative of prescribed signal-to-noise ratio information associated with a signal incident upon said plurality of antennas.

7. An antenna system according to claim 6, wherein said weighting control signal is derived in accordance with the angle of incidence of said signal upon and antenna whose downconverted output is coupled to said respective carrier demodulator.

8. A signal processing system for processing signals derived from a plurality of generally panel-configured phased array antennas having a prescribed multidimensional spatial relationship with respect to one another comprising:

a plurality of carrier demodulators respectively coupled to process signals representative of signal outputs of said plurality of generally panel-configured phased array antennas, so as to output baseband, carrier-demodulated signals;

a baseband signal processor which is operative to process a combination of said baseband, carrier-demodulated signals to derive baseband information signals contained therein; and wherein operation of a plurality of carrier recovery loops of said carrier demodulators is controlled in accordance with said baseband information signals, and wherein a respective carrier demodulator is operative to regenerate a coherent carrier reference signal for demodulating a downconverted signal from each of said plurality of generally panel-configured phased array antennas, and is operative to convert a carrier-demodulated signal into soft decision information signals, and wherein said baseband signal processor is operative to combine said soft decision information signals to produce a composite baseband signal, and to process said composite baseband signal to derive baseband decision information signals, and wherein, said baseband decision information signals are fed back to control the internal operation of each of said plurality of carrier demodulators.

9. A signal processing system according to claim 8, wherein a respective carrier demodulator includes a matched filter detector that converts said carrier-demodulated signal into said soft decision information signals.

10. A signal processing system according to claim 9, wherein a respective carrier demodulator is configured to weight baseband, carrier-demodulated signals in accordance with prescribed signal-to-noise ratio information associated with a signal incident upon said plurality of generally panel-configured phased array antennas.

11. A signal processing system according to claim 10, wherein said respective carrier demodulator is configured to weight baseband, carrier-demodulated signals in accordance with the angle of incidence of said signal upon a generally panel-configured phased array antenna whose downconverted output is coupled to said respective carrier demodulator.

12. A signal processing system according to claim 9, wherein the operation of the carrier recovery loop of said respective carrier demodulator is weighted in accordance with a prescribed signal-to-noise ratio information associated with a signal incident upon said plurality of generally panel-configured phased array antennas.

13. A method of deriving information from a signal comprising the steps of:

(a) arranging a plurality of antennas capable of receiving said signal incident thereon in accordance with a prescribed multidimensional spatial relationship;

(b) downconverting outputs of said plurality of antennas to produce a plurality of intermediate frequency (IF) signals representative of said signal incident upon said plurality of antennas;

(c) performing carrier demodulation of said IF signals to derive baseband, carrier-demodulated signals;

(d) processing a combination of said baseband, carrier-demodulated signals to derive baseband information signals contained therein; and (e) controlling said carrier demodulation of step (c) in accordance with said baseband information signals derived in step (d), and wherein step (c) comprises regenerating a coherent carrier reference signal for demodulating said downconverted signal from each of said plurality of antennas through a carrier recovery loop and processing a carrier-demodulated signal to obtain soft decision information signals and wherein step (d) comprises combining said soft decision information signals associated with respect ones of said plurality of antennas to produce a composite baseband signal, and processing said baseband signal to derive a baseband decision information signals, and feeding back said baseband decision information signals to step (c) to control the performing of carrier demodulation of said IF signals to derive said baseband, carrier-demodulated signals.

14. A method according to claim 13, wherein said antennas comprise spaced apart, phased array antenna panels.

15. A method according to claim 13, wherein step (c) comprises processing a carrier-demodulated signal by means of a matched filter to obtain said soft decision information signals.

16. A method according to claim 15, wherein step (e) comprises controlling operation of carrier recovery loops in accordance with said baseband decision information signals.

17. A method according to claim 16, wherein step (c) comprises controlling the operation of the carrier loops of said plurality of carrier demodulators recovery in accordance with prescribed signal-to-noise ratio information associated with said signal incident upon said plurality of antennas.

18. A method according to claim 13, wherein step (c) further includes weighting said baseband, carrier-demodulated signals in accordance with prescribed signal-to-noise ratio information associated with said signal incident upon said plurality of antennas.

19. A method system according to claim 18, wherein said prescribed signal-to-noise ratio information is derived in accordance with the angle of incidence of said signal upon a selected antenna.

* * * * *